United States Patent
Price et al.

(10) Patent No.: US 10,344,615 B2
(45) Date of Patent: Jul. 9, 2019

(54) METHOD AND SYSTEM FOR SCHEDULE PREDICTIVE LEAD COMPENSATION

(71) Applicant: General Electric Company, Schenectady, NY (US)

(72) Inventors: Darryl Brian Price, Cincinnati, OH (US); Mitchell Donald Smith, Morrow, OH (US)

(73) Assignee: General Electric Company, Schenectady, NY (US)

(*) Notice: Subject to any disclaimer, the term of this patent is extended or adjusted under 35 U.S.C. 154(b) by 72 days.

(21) Appl. No.: 15/630,455

(22) Filed: Jun. 22, 2017

(65) Prior Publication Data

US 2018/0371936 A1    Dec. 27, 2018

(51) Int. Cl.
    *F01D 17/16*    (2006.01)
    *F01D 21/00*    (2006.01)
    *G05B 13/02*    (2006.01)

(52) U.S. Cl.
    CPC ........... *F01D 17/16* (2013.01); *F01D 21/003* (2013.01); *G05B 13/021* (2013.01); *G05B 13/026* (2013.01); *F05D 2220/32* (2013.01); *F05D 2240/12* (2013.01); *F05D 2270/44* (2013.01); *F05D 2270/54* (2013.01)

(58) Field of Classification Search
    None
    See application file for complete search history.

(56) References Cited

U.S. PATENT DOCUMENTS

| | | | |
|---|---|---|---|
| 4,159,444 A | 6/1979 | Bartlett et al. | |
| 4,242,592 A | 12/1980 | Yannone et al. | |
| 4,887,214 A | 12/1989 | Takats et al. | |
| 5,274,554 A | 12/1993 | Takats et al. | |
| 5,566,065 A * | 10/1996 | Hansen | G05B 13/026 700/28 |
| 5,596,502 A * | 1/1997 | Koski | G06Q 10/06 700/95 |
| 6,076,159 A * | 6/2000 | Fleck | G06F 9/3013 712/241 |
| 6,202,403 B1 * | 3/2001 | Laborie | B64D 33/08 60/39.83 |
| 7,889,710 B2 * | 2/2011 | Orth | H04L 47/26 370/229 |
| 7,960,934 B2 | 6/2011 | Benson et al. | |

(Continued)

*Primary Examiner* — Ramesh B Patel
(74) *Attorney, Agent, or Firm* — McGarry Bair, P.C.

(57) ABSTRACT

A method and system of scheduling a demand for a process inner loop are provided. The loop controller includes an inner loop control system configured to generate a control output signal for a controllable member and a schedule demand module configured to receive parameter values for a controlled variable of a process from a parameter source and to generate a scheduled demand output using a demand schedule. The loop controller also includes a schedule prediction module configured to predict a future value of a scheduling parameter based on a historical performance of the inner loop control system and current system dynamics and to generate a scheduled rate output. The schedule prediction module includes the rate-of-change of a scheduling parameter and a lead time input that defines a look-ahead time period used with the parameter rate signal to determine a future predicted value of the controlled variable.

20 Claims, 8 Drawing Sheets

(56) References Cited

U.S. PATENT DOCUMENTS

| | | | |
|---|---|---|---|
| 8,090,456 B2 | 1/2012 | Karpman et al. | |
| 8,220,245 B1 | 7/2012 | Papandreas | |
| 8,276,363 B2 | 10/2012 | Seely et al. | |
| 8,820,677 B2 | 9/2014 | Rajashekara et al. | |
| 8,898,040 B2 | 11/2014 | Larimore | |
| 10,089,441 B2* | 10/2018 | Day | G06F 19/00 |
| 2013/0223976 A1* | 8/2013 | Smith | G05B 19/0426 |
| | | | 415/1 |
| 2015/0039280 A1 | 2/2015 | Larimore | |
| 2015/0081911 A1* | 3/2015 | Li | G06N 3/126 |
| | | | 709/226 |
| 2015/0211422 A1 | 7/2015 | Lickfold et al. | |
| 2015/0377145 A1* | 12/2015 | Smith | G05B 19/0426 |
| | | | 415/1 |
| 2016/0146431 A1 | 5/2016 | Froehlich et al. | |
| 2016/0371441 A1* | 12/2016 | Day | G16H 40/20 |

* cited by examiner

METHOD AND SYSTEM FOR SCHEDULE PREDICTIVE LEAD COMPENSATION

STATEMENT REGARDING FEDERALLY SPONSORED RESEARCH & DEVELOPMENT

This invention was made with Government support under contract number N00014-10-D-0010 awarded by the Department of the Navy. The Government may have certain rights in this invention.

BACKGROUND

The field of the disclosure relates generally to process control loops and, more particularly, to a method and system for reducing ramp tracking errors of process control devices.

When designing control system inner loops to mitigate ramp tracking error of process control devices, a balance between transient tracking capability and steady-state stability can be difficult to maintain. A damped inner loop provides predictable stable results. However, transient tracking errors become more significant as inner loop ramp rates increase. This can drive a desire for more aggressive tuning of the inner loops to meet transient performance requirements. Aggressive gains and traditional feed-forward methods lead to overshoot and undesirable stability challenges.

Transient tracking of scheduled engine parameters is often a trade-off between inner loop stability and inner loop frequency response. Designing an inner loop system with the frequency response characteristics to have low transient tracking can result in a less stable, underdamped response with excess overshoot during transients.

A more stable inner loop design is damped or critically damped. While a critically damped inner loop is well behaved, transient tracking errors can be significant to the overall system design. A critically damped system has a response that lags the demand input. This lag typically correlates with a time delay of a deterministic amount. This time lag creates a transient tracking error that is directly proportional to the demand ramp rate.

BRIEF DESCRIPTION

In one embodiment, a loop controller includes an inner loop configured to generate a control output signal for a controllable member and a schedule demand module configured to receive parameter values for a controlled variable of a process of a system from one or more parameter sources and to generate a scheduled demand output using a demand schedule. The loop controller also includes a schedule prediction module configured to predict a future value of a scheduling parameter based on a historical performance of the inner loop control system and current system dynamics and to generate a scheduled rate output using a rate-of-change of a scheduling parameter. The schedule prediction module includes a rate-of-change of a scheduling parameter and a lead time input that defines a look-ahead time period used with the parameter rate signal to determine a future predicted value of the controlled variable.

Optionally, the one or more parameter sources include a physical sensor, a virtual sensor, an electronic model result, an algorithmic result, or a combination thereof. Also optionally the one or more parameter sources include an output from a computer system monitoring at least one controlled variable. The inner loop control system may have a damped response.

Optionally, the schedule prediction module is configured to compensate for the inner loop control system dynamics by looking ahead for the time period defined by the lead time input to demand a future value of the control output signal for the controllable member, such that the control output signal follows the scheduled demand output without significant transient tracking error. Also optionally the inner loop control system includes a first summing junction configured to receive the scheduled rate output and the scheduled demand output and generate a first summing junction output. The inner loop control system may include a second summing junction configured to receive the first summing junction output and the scheduled demand output and generate an inner loop demand signal.

In another embodiment, a method of scheduling a demand for an inner loop of a process control system is based on a rate-of-change of a scheduling parameter of a process and a selectable future time period. The method includes receiving, by a sensing system, sensed values for controlled variables of the process from one or more sensors and determining values to be applied to the inner loop, using the sensed values, for each of at least one controlled variable of the process, each value for the at least one controlled variable being determined based on a rate-of-change of the scheduling parameter and a selectable time period.

Optionally, the method includes receiving values for controlled variables of the process from one or more of a physical sensor, a virtual sensor, an electronic model result, an algorithmic result, and a combination thereof. Also optionally the method includes combining a demand schedule of the controlled variables and a prediction of scheduling parameters based on the rate-of-change of a scheduling parameter. The method may also include determining a time shift of the inner loop. Optionally the method includes receiving a speed value for a rotatable member of a rotatable machine, determining an acceleration of the rotatable machine using the received speed value, and applying a speed rate-of-change signal. Also optionally the method includes receiving a pressure value for a process system, determining a pressure rate-of-change of the pressure value using the received pressure value and applying a pressure rate-of-change signal.

In yet another embodiment, a loop controller includes an inner loop control system configured to generate a control output signal for a controllable member and a schedule demand module configured to receive parameter values for a controlled variable of a process of a system from one or more parameter sources and to generate a scheduled prediction demand output using a demand schedule and a schedule prediction module configured to predict a future value of a scheduling parameter based on a historical performance of the inner loop control system and current system dynamics and to generate the scheduled prediction demand output using lead/lag compensation and the demand schedule.

Optionally, the demand schedule includes at least one of a look-up table, a model, an algorithm, or combinations thereof. Also optionally, the one or more parameter sources includes an output from a computer system monitoring at least one controlled variable. Optionally, the scheduled prediction demand output is generated using a demand schedule and a schedule prediction module. The schedule prediction module may provide lead compensation prior to the demand schedule. Optionally, the demand schedule and the schedule prediction module are configured to predict a future value of the scheduling parameter based on a historical performance of inner loop control system and current system dynamics.

BRIEF DESCRIPTION OF THE DRAWINGS

FIGS. 1-8 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of Schedule Predictive Lead Compensation of inner loops in industrial, commercial, and residential applications.

A difference of Schedule Predictive Lead Compensation as described herein from a traditional feed-forward technology is the use of information from the scheduling parameter in determining the demand lead.

Schedule Predictive Lead Compensation permits the design of a damped inner loop control system to meet steady-state goals, while not sacrificing transient tracking performance. Schedule Predictive Lead Compensation compensates for the inner loop dynamics by looking ahead to demand where the control output should be in the future, so the control output is able to follow the actual schedule without significant transient tracking error.

Schedule Predictive Lead Compensation maintains the stability of a damped system. It treats the inner loop response as a black box that has a 1st-Order or a 2nd-Order damped response and compensates for the lagged effect. Schedule Predictive Lead Compensation compensates on the input demand by looking ahead by the time-lag amount defined by the inner loop response.

In some embodiments, the Schedule Predictive Lead Compensation design benefits from two assumptions; 1) the inner loop control system can be characterized by a $1^{st}$-Order damped response or a $2^{nd}$-Order damped response, and 2) there is some inertial term on the scheduling parameter such that there cannot be an instantaneous change. More specifically, the scheduling parameter's dynamics are typically slower than the inner loop control system dynamic response.

This Schedule Predictive Lead Compensation approach uses knowledge of the scheduling parameter to "lead" the demand schedule by looking ahead using a rate-of-change of the scheduling parameter and expected inner loop response time lag, to bias the demand. By using this approach, Schedule Predictive Lead Compensation can greatly improve transient tracking without leading to overshoot which can result from traditional feed-forward methods. Although described herein with reference to gas turbine engine scheduled inner loops, such as fan variable geometry (FVG) and compressor variable geometry (CVG), it should be understood that Schedule Predictive Lead Compensation is adaptable to other engine inner loops or industrial applications that use scheduling parameters. For example, the rate-of-change calculation for the scheduling parameters can be performed via different methods for each of a plurality of different specific applications. Moreover, thresholds or saturation limits of the basic Schedule Predictive Lead Compensation design can be altered to accommodate specific applications.

The following description refers to the accompanying drawings, in which, in the absence of a contrary representation, the same numbers in different drawings represent similar elements.

Figure 1:
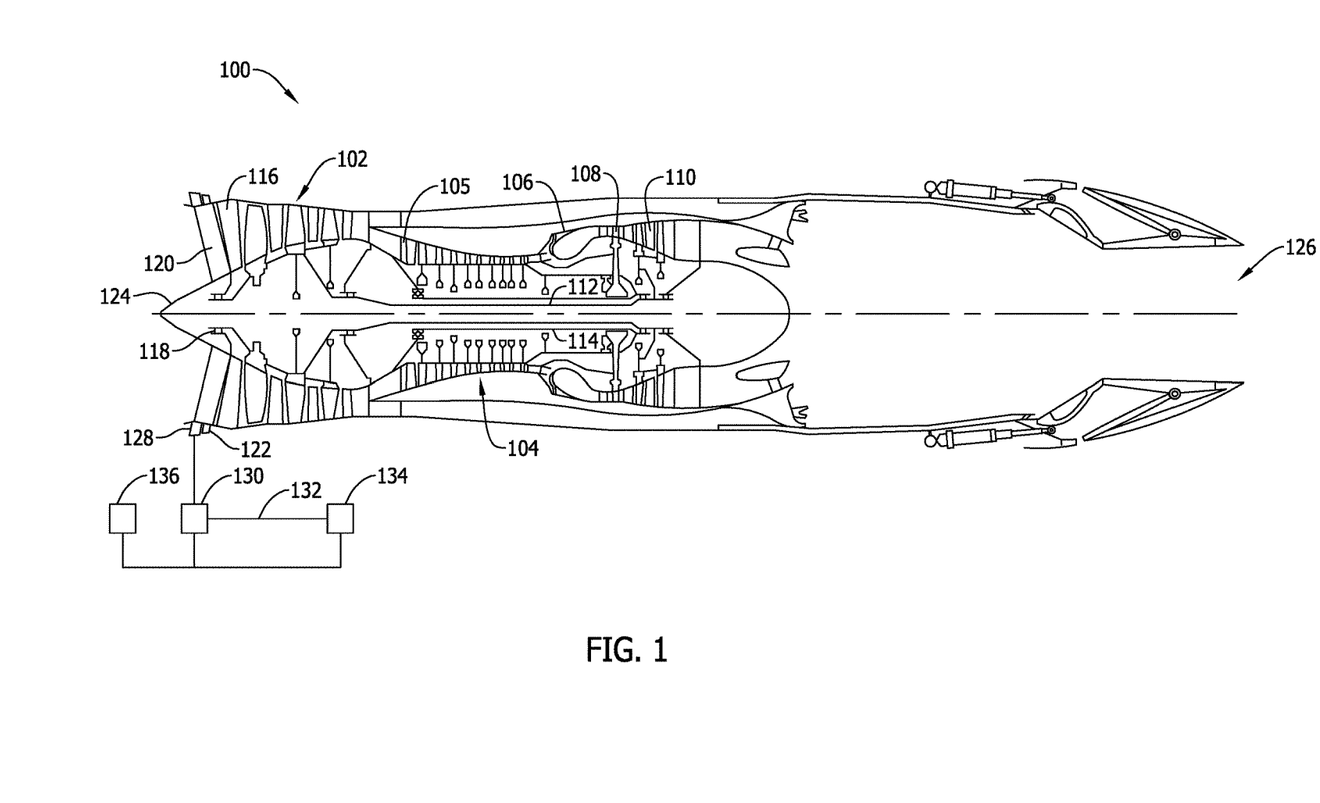
FIG. 1 is a schematic cross-sectional view of a gas turbine engine in accordance with an exemplary embodiment of the present disclosure.

FIG. 1 is a schematic illustration of a gas turbine engine 100 including a fan assembly 102, a high pressure compressor 104 that includes a plurality of circumferentially-spaced compressor inlet guide vane (IGV) assemblies 105, and a combustor 106. In one embodiment, gas turbine engine 100 is an F-110 engine commercially available from General Electric Company, Cincinnati, Ohio. Gas turbine engine 100 also includes a high pressure turbine 108 and a low pressure turbine 110, all arranged in a serial, axial flow relationship. Fan assembly 102 and turbine 110 are coupled by a first shaft 112, and high pressure compressor 104 and high pressure turbine 108 are coupled by a second shaft 114.

Gas turbine engine 100 also includes an annular frame 116 which supports a bearing 118, which, in turn, supports one end of first shaft 112, for allowing rotation thereof. A plurality of circumferentially-spaced fan inlet guide vane (IGV) assemblies 120 extend between an outer structural case ring 122 and a center hub 124 and direct airflow entering gas turbine engine 100.

In operation, air flows through fan IGV assembles 120 and through fan assembly 102, such that compressed air is supplied from fan assembly 102 to high pressure compressor 104 to generate a more highly compressed air. The highly compressed air is delivered to combustor 106. Combustion gases from combustor 106 drives rotating turbines 108 and 110 and exits gas turbine engine 100 through an exhaust nozzle 126. Gas turbine engine 100 is operable at a range of operating conditions between design operating conditions and off-design operating conditions.

In general, gas turbine engine 100 includes a plurality of sensors and control system elements to position fan IGV assemblies 120 and compressor IGV variable geometry, in addition to other functions. For example, in various embodiments, gas turbine engine 100 includes an actuator ring 128 operatively coupled to fan IGV assemblies 120. Actuator ring 128 is positionally controlled by an IGV actuator 130, which receives control signals 132, from, for example, a computer system, such as, an electronic controller 134. In some embodiments, electronic controller 134 is embodied in, for example, an engine electronic control (EEC), an adaptive fault tolerant controller (AFTC), or other flight control computer. A sensor 136, for example, an inlet temperature sensor T2 generates an output signal representative of a measured parameter relating to gas turbine engine 100. In the example embodiment, electronic controller 134 is programmed to adjust a position of fan IGV assemblies 120 using an input from sensor 136 as described in detail below.

Gas turbine engine 100 is depicted in the figures by way of example only, in other exemplary embodiments, gas turbine engine 100 may have any other suitable configuration including for example, a turboprop engine, a turbojet engine, a military purpose engine, and a marine or land-based aero-derivative engine.

Figure 2:
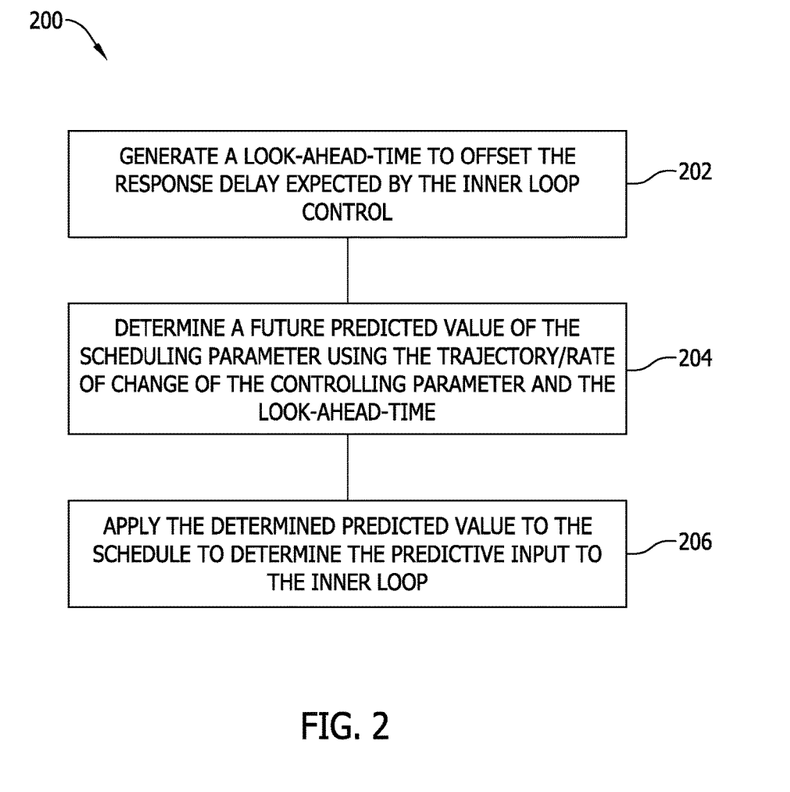
FIG. 2 is a flowchart of a method of scheduling a demand for an inner loop of a process control system.

FIG. 2 is a flowchart of a method 200 of scheduling a demand for an inner loop of a process control system. Method 200 is based on a rate-of-change of a scheduling parameter for a controlled variable of a process and a selectable future time period. Controlled variable of a process may include a pressure parameter, a speed parameter, a temperature parameter, and the like. Accordingly, the rate-of-change of a scheduling parameter for such controller variables are referred to as a pressure rate-of-change schedule, speed rate-of-change schedule, and temperature rate-of-change schedule, respectively. In the example embodiment, method 200 includes generating 202 a look-ahead-time to offset the response delay expected by the inner loop control system, determining 204 a future predicted value of a scheduling parameter using the trajectory/rate-of-change of the controlling parameter and the look-ahead-time, and applying 206 the determined predicted value to the schedule to determine the predictive input to the inner loop control system. A sensing system, for example, sensor 136 may provide sensed values for controlled variables of the process being controlled. Sensor 136 may include a physical sensor, a virtual sensor, an electronic model result, an algorithmic result, and a combination thereof.

Figure 3:
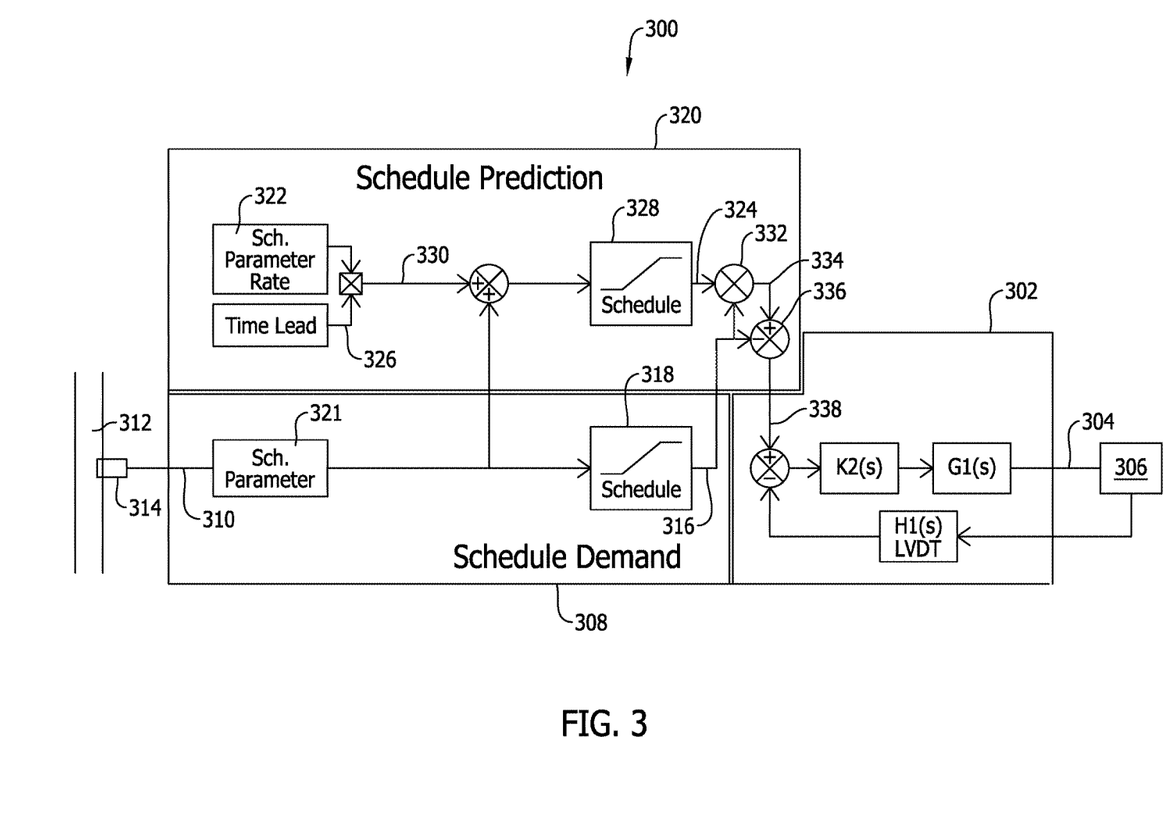
FIG. 3 is a schematic diagram of a loop controller that may be used with the gas turbine engine shown in FIG. 2.

FIG. 3 is a schematic diagram of a loop controller 300 that may be used with gas turbine engine 100 (shown in FIG. 1). In the example embodiment, loop controller 300 includes an inner loop control system 302 configured to generate a control output signal 304 for a controllable member 306, such as, but not limited to, a modulating actuator 130 connected to a variable inlet guide vane assembly 105, 120. Loop controller 300 also includes a schedule demand module 308 configured to receive parameter values 310 for a controlled variable 312 of a process of a system from one or more parameter sources 314 and to generate a scheduled demand output 316 using a demand schedule 318. In the example embodiment, demand schedule 318 represents expected or future values of inner loop demand given a value of a scheduling parameter 321. Demand schedule 318 may be embodied in a look-up table, a model, an algorithm, or combinations thereof. In various embodiments, one or more parameter sources 314 may be embodied in a physical sensor, a virtual sensor, an electronic model result, an algorithmic result, and a combination thereof. In other embodiments, one or more parameter sources 314 may be embodied in an output from another system, such as, but not limited to an engine electronic control (EEC), a full authority digital electronic control (FADEC), a flight control computer, or combinations thereof.

A schedule prediction module 320 is configured to predict a future value of scheduling parameter 321 based on the current rate-of-change of scheduling parameter 321 and the expected performance of inner loop control system 302 based on its system dynamics to generate a look-ahead scheduling parameter bias signal 330. In one embodiment, scheduling parameter 321 may represent a core speed value of gas turbine engine 100. In the example embodiment, schedule prediction module 320 includes rate-of-change of a scheduling parameter 322 that associates a corresponding value of controllable member 306 for predetermined values of controlled variable 312 and a lead time input 326 that defines a look-ahead time period used with rate-of-change of a scheduling parameter 322 to determine look-ahead scheduling parameter bias signal 330 to be added to scheduling parameter 321 to yield a future predicted value of the scheduling parameter 321.

Lead time input 326 correlates with the capabilities of inner loop control system 302, which is designed with a known damped frequency response. With the damped frequency response known, a prediction on the time lead is determined. Accordingly, lead time could be a function of certain parameters, such as a load on actuator 130. Schedule prediction module 320 is configured to compensate for inner loop control system 302 dynamics by looking ahead for the time period defined by lead time input 326 to demand a future value of a look-ahead bias or inner loop demand signal 338, such that control output signal 304 follows scheduled demand output 316 without significant transient tracking error.

A predictive demand schedule 328 is identical to demand schedule 318, in that it represents the ideal schedule demand. Inner loop demand signal 338 provides the expected or future values of the inner loop given a current value and rate-of-change of scheduling parameter 321. In this case, the predicted future value of scheduling parameter 321 is the input and the output of predictive demand schedule 328 is a look-ahead schedule output 324 for inner loop control system 302.

The schedule prediction module 320 includes a first summing junction 332 configured to receive the look-ahead schedule output 324 and scheduled demand output 316 and generate a first summing junction output 334 which provides the look-ahead bias to the primary inner loop scheduled demand output 316. The schedule prediction module 320 also includes a second summing junction 336 configured to receive first summing junction output 334 and scheduled demand output 316 and generate inner loop demand signal 338, which is an input to inner loop control system 302.

Scheduling parameter 321 is the primary parameter that is used to determine how inner loop control system 302 should respond. Rate-of-change of a scheduling parameter 322 provides the current rate-of-change of scheduling parameter 321. In the example where scheduling parameter 321 represents a rotor speed, this rate cannot change rapidly due to system inertia. Therefore the rate provides a good prediction for where scheduling parameter 321 will be in the future. Schedule Predictive Lead Compensation enables inner loop control system 302 to begin reacting to upcoming changes in scheduled demand output 316 using inner loop demand signal 338 before the normal scheduled demand output 316 would have reacted, minimizing tracking errors and overshoot.

Figure 4:
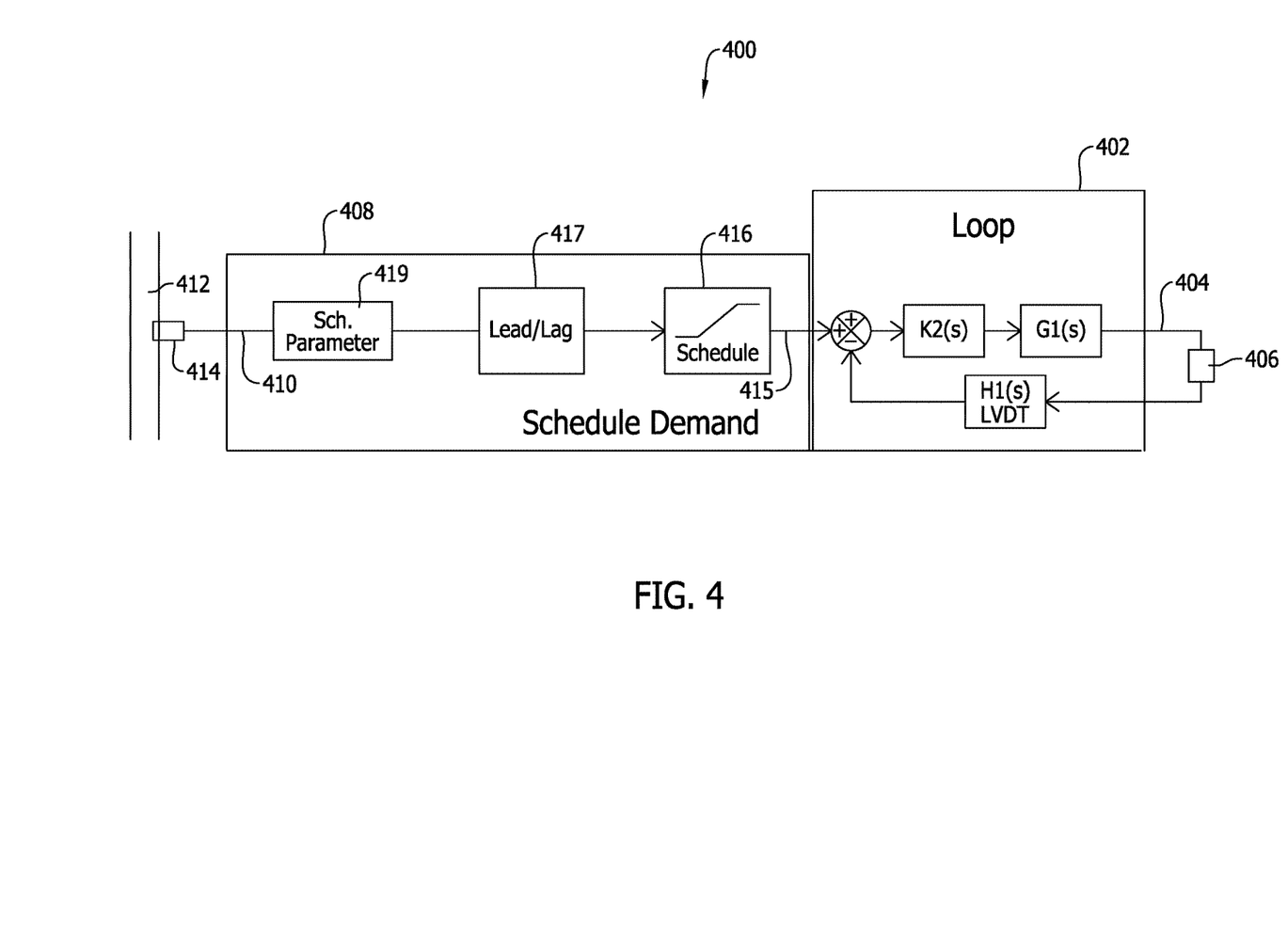
FIG. 4 is a schematic diagram of a loop controller that may be used with the gas turbine engine shown in FIG. 2.

FIG. 4 is a schematic diagram of a loop controller 400 in accordance with another example embodiment of the present disclosure. Loop controller 400 includes an inner loop control system 402 configured to generate a control output signal 404 for a controllable member 406 and a schedule demand module 408 configured to receive scheduling parameter values 410 for a controlled variable 412 of a process of a system from one or more parameter sources 414 and to generate a predictive schedule demand output 415. Predictive schedule demand output 415 is generated using a demand schedule 416 and a schedule prediction module 417, which includes a traditional lead/lag compensation feature, to provide lead compensation for scheduling parameter 321, 419 prior to the demand schedule 416. Demand schedule 416 and schedule prediction module 417 are configured to predict a future value of a scheduling parameter 419 based on a historical performance of inner loop control system 402 and current system dynamics and to generate predictive schedule demand output 415 using schedule prediction module 417 and demand schedule 416.

Figure 5:
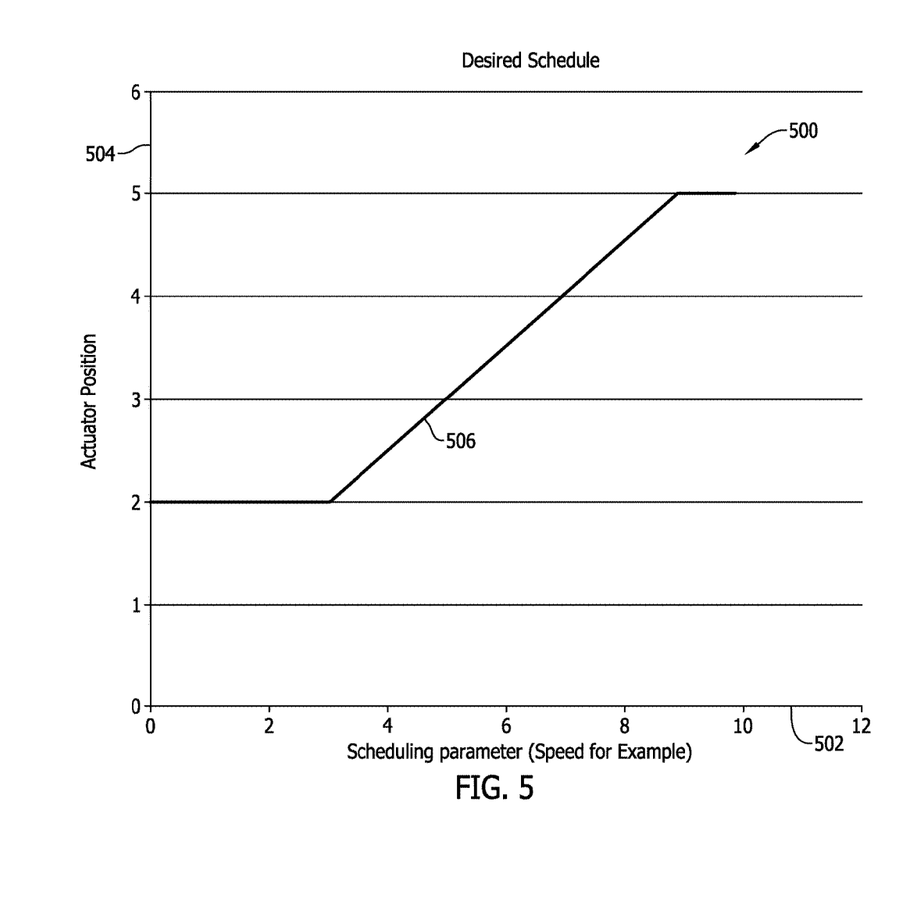
FIG. 5 is an example actuator position schedule versus the controlling parameter, engine speed for example.

FIG. 5 is a graph 500 an example demand schedule that may be used with loop controller 300, 400 (shown in FIGS. 3 and 4 respectively. Graph 500 includes an x-axis 502 graduated in units of a scheduling parameter, for example, but not limited to speed, temperature, pressure, and the like. Graph 500 also includes a y-axis 504 graduated in units of an actuator position, for example, but not limited to a position of fan IGV assemblies 120. Graph 500 includes a trace 506 showing values of the example demand schedule 318, 416. In the example embodiment, between approximately x-axis unit zero and x-axis unit 3 on x-axis 502, trace 506 maintains a constant value with a zero rate-of-change. At, x-axis unit 3, trace 506 shows a significant positive rate-of-change. The rate-of-change continues positive while the actuator position increases to approximately y-axis unit 5 at approximately x-axis unit 8. The rate-of-change of trace 506 returns to approximately zero at x-axis unit 8.

Figure 6:
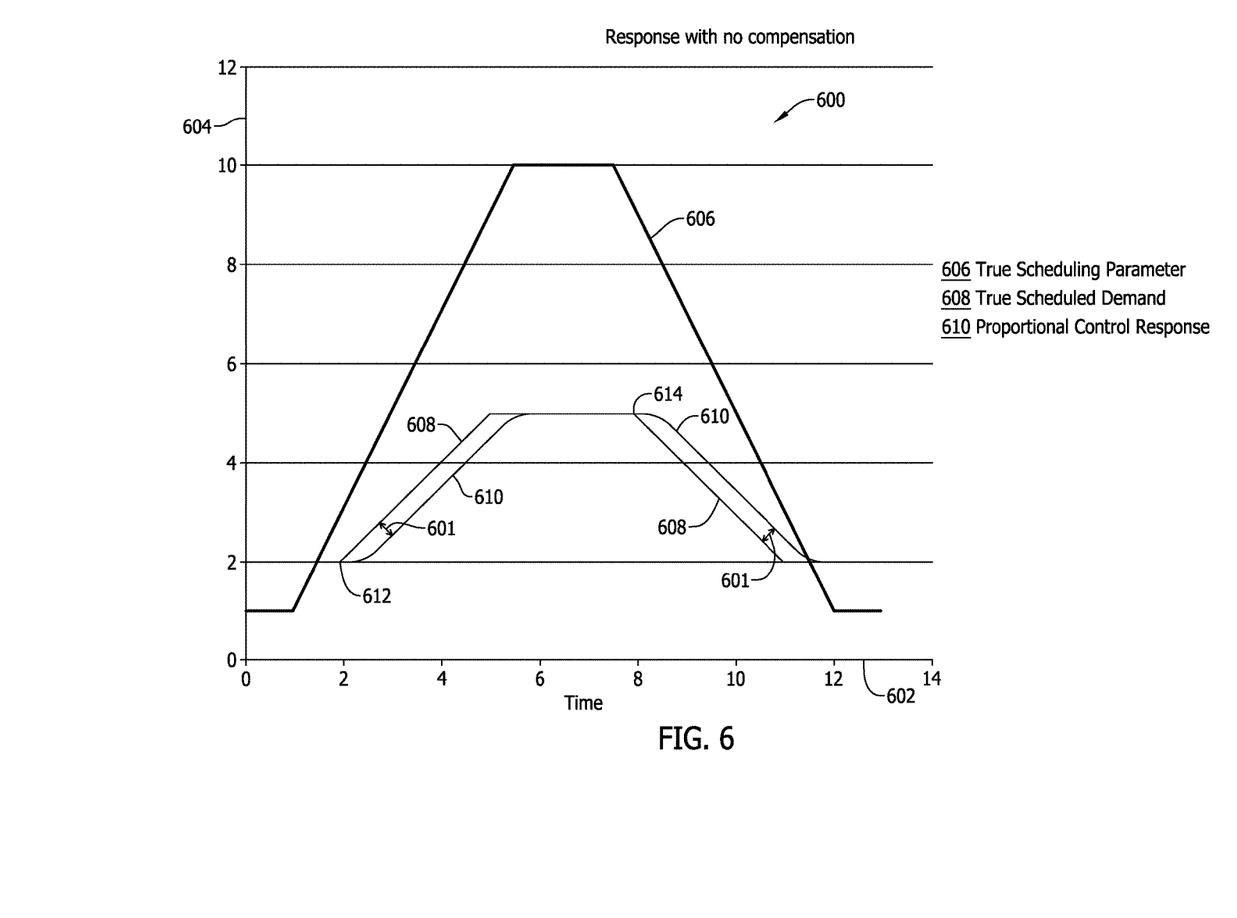
FIG. 6 is a graph of the actuator response to speed increase and decrease using a simple proportional control approach.

FIG. 6 is a graph 600 showing a response of a simple proportional-integral (PI) control system. Graph 600 illustrates a significant transient tracking error 601, driven by inner loop control system response lag. Graph 600 includes an x-axis 602 graduated in units of time. Graph 600 also includes a y-axis 604 graduated in units of response, for example, but not limited to a position of fan IGV assemblies 120. Graph 600 includes a trace 606 showing values of the true scheduling parameter versus time and a trace 608 showing the true scheduled demand versus time. Graph 600 includes a trace 610 of the proportional-integral (PI) control response without compensation. Trace 610 significantly lags trace 608 and at transient points 612, 614 and continues to track trace 608 erroneously during the transient.

Figure 7:
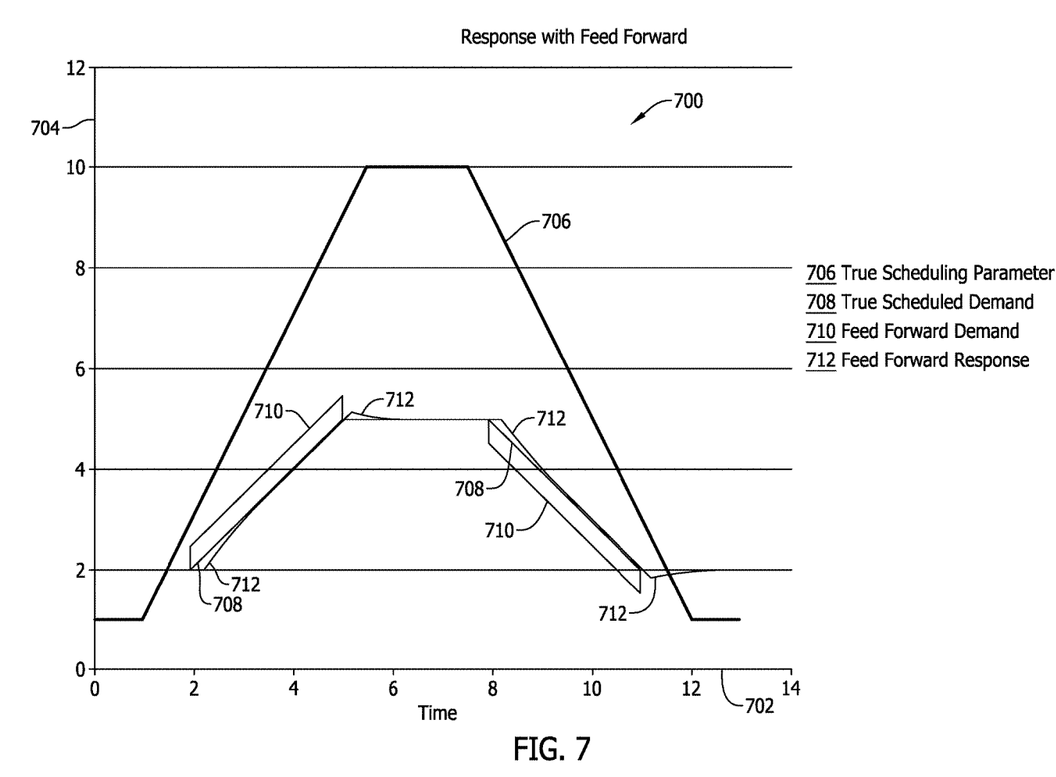
FIG. 7 is a graph of the actuator response to speed increase and decrease using a feed forward lead compensation approach.

FIG. 7 is a graph 700 showing the response of a control system with traditional lead compensation. Graph 700 includes an x-axis 702 graduated in units of time and a y-axis 704 graduated in units of response, for example, but not limited to a position of fan IGV assemblies 120. Graph 700 includes a trace 706 showing values of the true scheduling parameter versus time and a trace 708 showing the true scheduled demand versus time. Graph 700 includes a trace 710 of the feed forward demand and a trace 712 of the feed forward response. True scheduled demand, trace 708 is where electronic controller 134 is trying to track given any transients or perturbations that true scheduled demand, trace 708 undergoes. Feed forward response, trace 712 is the trace that should coincident with true scheduled demand, trace 708. Feed forward demand, trace 710. injects a control signal that facilitates swinging feed forward response, trace 712 earlier than the proportional-integral (PI) control shown in FIG. 6. Feed forward demand, trace 710 improves tracking error, however, it also increases control overshoot at the beginning of transients and more so as transients end. For example, as true scheduled demand, trace 708 increases at time 2, feed forward demand, trace 710 jumps a predetermined amount to turn feed forward response, trace 712 as quickly as possible to attempt to get feed forward response, trace 712 to track true scheduled demand, trace 708. However, there is no anticipation of the change in true scheduled demand, trace 708 true scheduled demand, trace 708 and feed forward response, trace 712 overshoots true scheduled demand, trace 708 at time 2. Similar overshoots of true scheduled demand, trace 708 by feed forward response, trace 712 occur at time 5, time 8, and time 11. Lead compensation shifting of the inner loop demand, true scheduled demand, trace 708, provides improved transient tracking error, but it also causes significant errors and overshoots due to rapid changes in the scheduled position.

Figure 8:
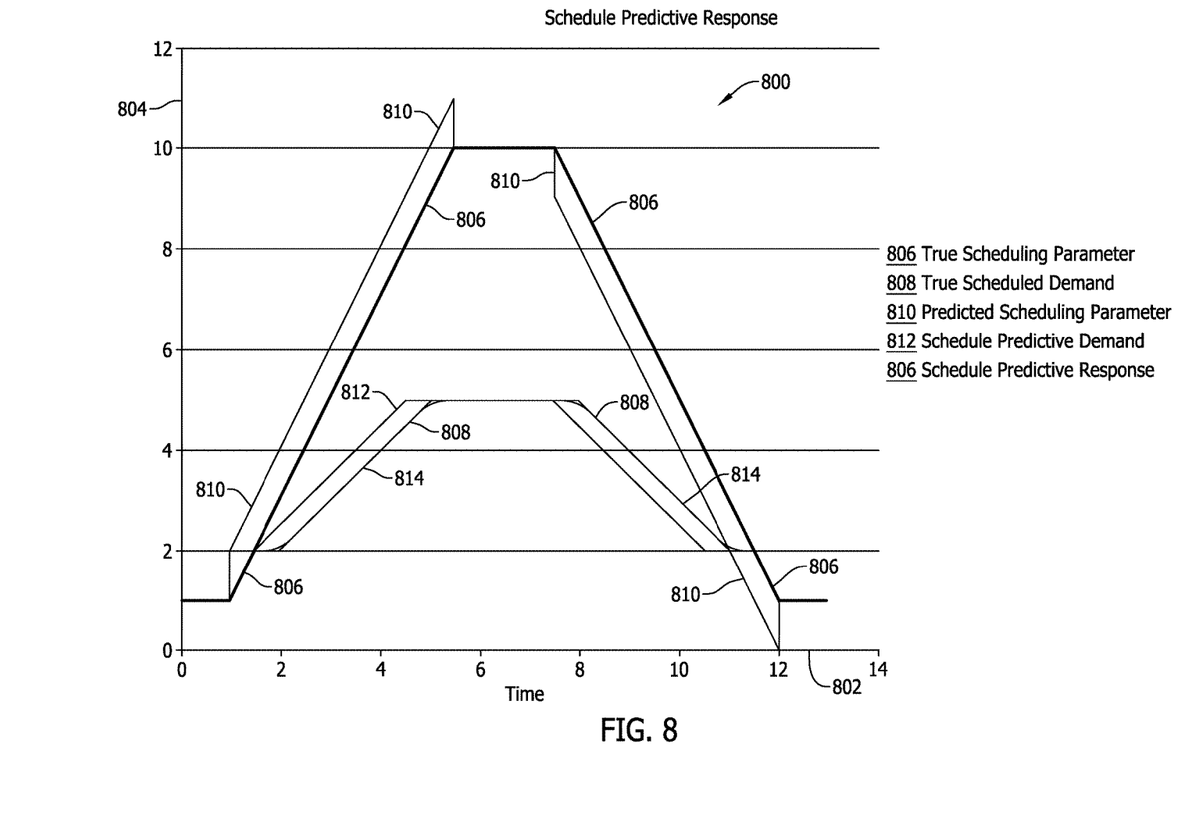
FIG. 8 is a graph of the actuator response to a speed increase and decrease using a Schedule Predictive Lead Compensation (SPLC) with an example embodiment of the present disclosure.

FIG. 8 is a graph showing the response of a control system with the Schedule Predictive Lead Compensation described herein. Graph 800 includes an x-axis 802 graduated in units of time and a y-axis 804 graduated in units of response, for example, but not limited to a position of fan IGV assemblies 120. Graph 800 includes a trace 806 showing values of the true scheduling parameter, trace 806 versus time and a trace 808 showing the true scheduled demand, trace 708 versus time. Graph 800 includes a trace 810 of the predicted scheduling parameter and a trace 812 of the schedule predictive demand. Graph 800 includes a trace 814 of the scheduled predictive response. Rather than applying a feed forward correction to the true scheduled demand, trace 808, as is done in FIG. 7, in this embodiment, the Schedule Predictive Lead Compensation scheme, electronic controller 134 applies the determined Schedule Predictive Lead Compensation to true scheduling parameter, trace 806. The Schedule Predictive Lead Compensation receives the benefit of lead compensation on true scheduling parameter, trace 806 prior to true scheduled demand, trace 808 turning. Schedule Predictive Lead Compensation provides improved error tracking without significant overshoot at transient points in the inner loop control system 302, 402. Predictive shifting of true scheduling parameter, trace 706 results in improved transient tracking, with essentially no errors and overshoots due to rapid changes in the scheduled position.

The above-described Schedule Predictive Lead Compensation systems provide an efficient method for improving transient tracking error while maintaining the desirable characteristics of a damped inner loop control system 302, 402. Specifically, the above-described Schedule Predictive Lead Compensation looks ahead a determined time value and applies a schedule change upstream of the inner loop. Schedule Predictive Lead Compensation is applicable, but not limited to, parameters that are scheduled against inertially limited parameters such as fan speed or core speed. Some examples on large military engines include fan inlet guide vanes or core variable stator vanes (VSVs). The reduction in transient tracking error can allow engines to run closer to their stability limits and gaining performance. The inner loop design can put more focus on steady-state stability performance instead of tuning for transient performance.

An exemplary technical effect of the methods, systems, and apparatus described herein includes at least one of: (a) improving transient tracking error while maintaining desirable damped inner loop response characteristics, (b) applicable to parameters that are scheduled against inertially limited parameters such as fan speed or core speed, (c) applying the lead compensation to the relatively low frequency response of the scheduling parameter captures transient effects while also capturing high-frequency schedule slope changes, (d) implementing a lead compensation feature without many of its drawbacks such as overshoot by using extra information from a schedule parameter and engine parameters, (e) compensating the input demand by looking ahead by the time-lag amount defined by the inner loop control system response, and (f) inner loop control design is more focused on steady-state stability performance instead of tuning for transient performance.

The above-described embodiments of a method and system of Schedule Predictive Lead Compensation provides a cost-effective and reliable means for stabilizing the operation of damped inner loops in very fast applications. More specifically, the methods and systems described herein facilitate looking ahead to control changes and responding to those changes with a predictive schedule change. As a result, the methods and systems described herein facilitate improving engine performance in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A loop controller comprising:
   an inner loop control system configured to generate a control output signal for a controllable member;
   a schedule demand module configured to receive parameter values for a controlled variable of a process of a system from one or more parameter sources and to generate a scheduled demand output using a demand schedule; and
   a schedule prediction module configured to predict a future value of a scheduling parameter based on a historical performance of said inner loop control system and current system dynamics and to generate a scheduled rate output, said schedule prediction module comprising:
   a rate-of-change of the scheduling parameter used to generate a scheduled rate output; and
   a lead time input that defines a look-ahead time period used with the rate-of-change of the scheduling parameter to determine a future predicted value of the controlled variable.

2. The loop controller of claim 1, wherein said one or more parameter sources comprises a physical sensor, a virtual sensor, an electronic model result, an algorithmic result, and a combination thereof.

3. The loop controller of claim 1, wherein said one or more parameter sources comprises an output from a computer system monitoring at least one controlled variable.

4. The loop controller of claim 1, wherein said inner loop control system has a damped response.

5. The loop controller of claim 1, wherein said schedule prediction module is configured to compensate for inner loop control system dynamics by looking ahead for the time period defined by the lead time input to demand a future value of the control output signal for the controllable member, such that the control output signal follows the scheduled demand output without significant transient tracking error.

6. The loop controller of claim 1, wherein said inner loop control system comprises a first summing junction configured to receive the scheduled rate output and the scheduled demand output and generate a first summing junction output.

7. The loop controller of claim 6, wherein said inner loop control system comprises a second summing junction configured to receive the first summing junction output and the scheduled demand output and generate an inner loop demand signal.

8. A method of scheduling a demand for an inner loop of a process control system based on a rate-of-change of a scheduling parameter of a process and a selectable future time period, said method comprising:
   receiving, by a sensing system, sensed values for controlled variables of the process from one or more sensors;
   determining values to be applied to the inner loop, using the sensed values, for each of at east one controlled variable of the process, each value for the at least one controlled variable being determined based on a rate-of-change of the scheduling parameter and a selectable time period;
   applying the determined values to an input of the inner loop; and
   generating a control output signal for a controllable member by the inner loop.

9. The method of claim 8, wherein receiving, by a sensing system, values for controlled variables of the process from one or more sensors comprises receiving values for controlled variables of the process from one or more of a physical sensor, a virtual sensor, an electronic model result; an algorithmic result, and a combination thereof.

10. The method of claim 8, wherein determining values to be applied to the inner loop for each of at least one controlled variable of the process comprises combining a demand schedule of the controlled variables and a prediction of scheduling parameters based on the rate-of-change of a scheduling parameter.

11. The method of claim 8, further comprising determining a time shift of the inner loop.

12. The method of claim 8, wherein receiving, by a sensing system, sensed values for controlled variables of the process from one or more sensors comprises receiving a plurality of values for a speed of a rotatable member of a rotatable machine, the method further comprising:
   determining an acceleration of the rotatable machine using the received plurality of values for a speed; and
   applying a speed rate-of-change schedule.

13. The method of claim 8, wherein receiving, by a sensing system, sensed values for controlled variables of the process from one or more sensors comprises receiving a pressure value for a process system, the method further comprising:
   determining a rate-of-change of the pressure value using the received pressure value; and
   applying a pressure rate-of-change schedule.

14. A loop controller comprising:
an inner loop control system configured to generate a control output signal for a controllable member; and
a schedule demand module configured to receive parameter values for a controlled variable of a process of a system from one or more parameter sources and to generate a scheduled prediction demand output using:
a demand schedule;
a rate-of-change of the scheduling parameter used to generate a scheduled rate output; and
a schedule prediction module configured to predict a future value of a scheduling parameter based on a historical performance of said inner loop control system, the scheduled rate output, and current system dynamics and to generate the scheduled prediction demand output using lead/lag compensation and the demand schedule.

15. The loop controller of claim 14, wherein said demand schedule comprises at least one of a look-up table, a model, an algorithm, or combinations thereof.

16. The loop controller of claim 14, wherein said one or more parameter sources comprises an output from a computer system monitoring at least one controlled variable.

17. The loop controller of claim 14, wherein said inner loop control system has a damped response.

18. The loop controller of claim 14, wherein said scheduled prediction demand output is generated using a demand schedule and a schedule prediction module.

19. The loop controller of claim 18, wherein said schedule prediction module provides lead compensation prior to said demand schedule.

20. The loop controller of claim 18, wherein said demand schedule and said schedule prediction module are configured to predict a future value of said scheduling parameter based on a historical performance of inner loop control system and current system dynamics.

* * * * *